Oct. 23, 1928.

J. G. BENNETT 1,688,518

OUTLET BOX COVER ADJUSTER

Filed May 21, 1927

Inventor.
James G. Bennett
by Heard Smith & Tennant.
Attys.

Patented Oct. 23, 1928.

1,688,518

UNITED STATES PATENT OFFICE.

JAMES G. BENNETT, OF ARLINGTON, MASSACHUSETTS.

OUTLET-BOX-COVER ADJUSTER.

Application filed May 21, 1927. Serial No. 193,335.

This invention relates to improvements in outlet boxes and the object thereof is to provide means for assembling the cover of an outlet box upon the body of the box or receptacle in any desired angular relation thereto.

In the installation of outlet boxes in walls it is often very difficult to locate the outlet box in the correct position with respect to the face of the wall and with respect to its vertical and horizontal lines. This is caused by reason of the fact that the masons or carpenters in building the walls frequenutly do not leave a proper space for the outlet box, or permit bricks and tiles, and the like, to project in such a manner that the outlet box must necessarily be tilted more or less in one direction or another to occupy the space left for it. The cover plate of the box, which is exposed, must, however, be so located that the opening therein is in a vertical position. Usual types of outlet boxes are provided with ears at or in proximity to diagonally opposite corners and in order to permit an angular adjustment the corner portions of the cover plates have been provided with slots extending angularly with respect to the lower vertical edges of the cover plate. These slots permit an adjustment of the cover plate. In many instances, however, the adjustment thus afforded is wholly inadequate.

The object of the present invention is to provide an outlet box having adjusting members through which the cover plate is connected to the receptacle and which adjusting members will permit a much greater range of adjustment than has heretofore been accomplished by the means above described. This is accomplished by providing a plurality of adjusting members each having separated pivotal connections both with the cover and with the receptacle which will permit angular adjustment of the cover relatively to the face of the receptacle and in parallelism therewith.

In many instances also the space for mounting the outlet box is such that the face of the outlet box will necessarily be inclined relatively to the face of the wall. The cover plate must, of course, lie flush with the wall. Usually blocks or shims have been inserted between the edge of the cover and the body of the box which must be separated from the box to permit the cover plate to lie in the plane of the wall. The production of such shims, however, requires considerable time and the retention of the shims, when once inserted, is always uncertain.

A further object of the invention is to provide an outlet box with a spacer formed of easily severable sections so that any desired thickness or width of spacer may be employed to bring the cover plate into the plane of the wall.

A further object of the invention is to provide an outlet box with a spacer of this type comprising a series of superimposed rings which will permit the screw, which connects the cover of the outlet box to the receptacle or the adjusting member above described, to pass through the chamber of the spacer so that the spacer will be permanently held by the screw against removal, thereby insuring the permanency of the assemblage.

Other objects and features of the invention will more fully appear from the following description and the accompanying drawing and will be particularly pointed out in the claims.

A preferred embodiment of the invention is illustrated in the accompanying drawing, in which, Fig. 1 is a front view of a usual type of outlet box having the adjusting members comprising the present invention applied thereto;

Figure 1:
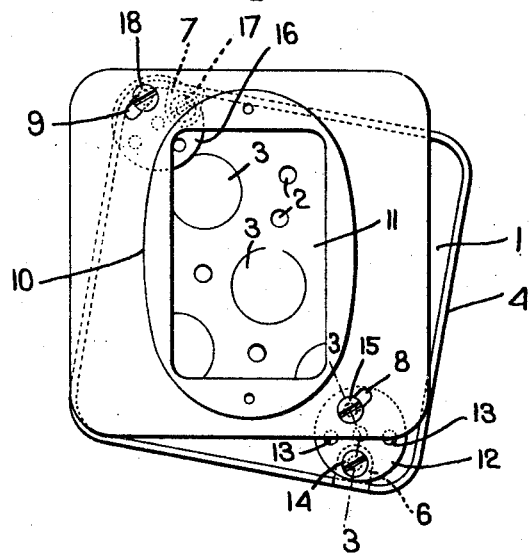

The outlet box illustrated in the accompanying drawing is of the usual type, formed of stamped sheet metal, comprising a rectangular bottom 1 provided with a plurality of screw holes 2 and knock-outs 3, the sides 4 of the receptacle extending from said bottom at right angles thereto and being provided with usual knock-outs 5. The diagonally opposite sides of the receptacle are provided with inwardly extending ears 6 and 7 which are formed from extensions integral with the side wall of the box and bent inwardly therefrom and provided with a central tapped screw hole. The cover of the box, which is of rectangular form to fit upon the rectangular sides of the box, is provided with slots 8 and 9 which extend diagonally of the corners of the box. The cover is provided with a usual central, upwardly extending, boss 10 having therein a rectangular opening 11 to permit access to the interior of the box. The box above described is of a usual type.

The present invention consists in providing means for permitting a more extended angular adjustment of the cover plate relatively to the body or receptacle than has heretofore been possible. This is accomplished by providing a plurality of adjusting members for connecting the cover plate and the receptacle, each of the adjusting members having separated pivotal connections, one of which connects the adjusting member to the cover and the other of which connects the adjusting member to the ear of the receptacle. These spacing members are connected to diametrically opposite portions of the cover and the box.

The adjusting members may be of any desired form, but preferably are in the form of circular disks 12 having a plurality of screw holes 13, one of which desirably is countersunk to receive the head of a screw 14 extending through a seat in the screw headed wall of an aperture in the ear 6. Another screw 15, which extends through the slot 8 of the cover plate, engages the tapped wall of one of the apertures 13. A similar disk 16 having like holes is pivotally mounted by a screw 17 upon the ear 7 at the diametrically opposite end of the box and a screw 18, extending through the slot 9 in the cover plate into a tapped hole in the disk 16, serves to secure the cover plate pivotally to the disk 16. The disks 12 and 16, therefore, are in effect parallel links which are pivotally connected respectively to the ears 6 and 7 and to diametrically opposite corners of the cover plate and will permit a wide adjustment of the cover plate angularly with respect to the box and in parallelism with the face of the box. The cover plate may, therefore, be made to assume the desired position upon the wall. The screws may then be set up to hold the cover plate permanently in position.

Figures 4, 5:
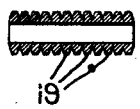
Fig. 4 is a longitudinal sectional view of a preferred form of spacer.
Fig. 5 is a sectional view of one of the transverse sections of the spacer illustrated in Fig. 4.

In some instances, as above stated, it is impossible to place the body or receptacle of the outlet box in parallelism with the face of the wall. Another feature of the invention consists in providing a spacer which will separate the end of the cover plate from the end of the box which is most remote from the plane of the wall a sufficient distance to cause the cover plate to lie in the plane of the wall. This is accomplished in the present invention by providing a special spacer comprising a hollow, preferably metallic, member formed of narrow, easily severable sections, any desired number of which may be severed from the body and interposed between the ear or adjusting member of the box and the cover plate. A preferred spacer is illustrated in Fig. 4 and comprises a series of rings 19 having flat contacting faces secured together in such a manner that any desired number may be severed from the body by a knife or by breakage.

Figure 2:
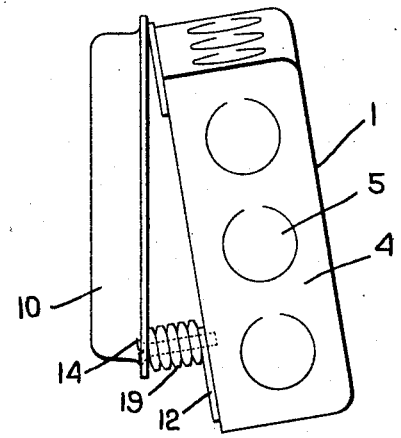
Fig. 2 is a side view of an outlet box illustrating the use of a spacer of the present invention for positioning the cover plate vertically, notwithstanding the inclination of the body of the box or receptacle relatively to a vertical position.
Figure 3:
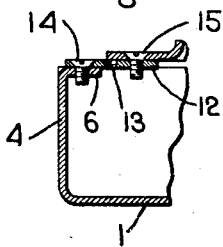
Fig. 3 is a detail sectional view illustrating the manner in which one of the adjusting members connects the cover plate to the receptacle.

As illustrated in Fig. 2 a section of five of such rings 19 are interposed between the under face of the lower end of the cover plate and the adjusting disk 12, it being obvious that in this particular illustration the box is located in angular relation to the wall and also in angular relation to the vertical position of the cover.

The spacer unit may be made in numerous ways, as for example, by turning in a hollow bar grooves extending nearly through the wall of the bar, or by assembling a series of rings having flat contacting faces, together with suitable means uniting the contacting faces, or preferably by assembling a series of rings of the character above described and securing them together by galvanization. Where a series of rings are thus employed it is desirable that the peripheral portions be beveled in opposite directions in order to provide grooves into which a severing tool may be readily introduced and also to diminish the area to which the material securing the rings together is applied.

It will be understood that the embodiment of the invention disclosed herein is of an illustrative character and is not restrictive and that various changes in form, construction and arrangement of parts may be made within the spirit and scope of the following claims.

Having thus described the invention, what is claimed as new, and desired to be secured by Letters Patent, is:

1. An outlet box comprising a receptacle, a cover plate therefor and a plurality of pivotally mounted adjusting members connecting said cover plate to said receptacle, each having a plurality of separated pivotal connections both with the cover and with the receptacle permitting angular adjustment of said cover relatively to the face of the receptacle.

2. An outlet box comprising a receptacle, a cover plate therefor, a plurality of pivotally mounted adjusting members connecting said cover plate to said receptacle having a plurality of screw holes spaced apart and complementary screw holes in said cover plate and receptacle, the walls of certain of said holes being tapped and a pair of screws in each connecting member engaging respectively the receptacle and the cover plate and forming pivotal connections therebetween permitting varied angular adjustment of the cover relatively to the face of the receptacle.

3. An outlet box comprising a rectangular receptacle having ears extending from the upper portion of diametrically opposite side walls provided with tapped screw holes, a cover plate having complementary screw holes positioned normally to register with the holes in said ears and a pair of pivotally mounted adjusting members each having screw holes to receive a screw connecting the same to an ear and another tapped hole to receive a screw extending through the complementary hole in the cover plate.

4. An outlet box comprising a rectangular receptacle having ears extending from the upper portion of diametrically opposite side walls provided with tapped screw holes, a cover plate having complementary screw holes positioned normally to register with the holes in said ears, a pair of adjusting disks each having a countersunk screw hole near its periphery receiving a screw pivotally connecting the same to an ear and provided with other tapped holes adapted selectively to receive a screw extending through the complementary hole in the cover plate.

5. An adjustable connecting member for outlet boxes comprising a metallic plate having separated screw holes adapted to receive screws respectively pivotally connecting said member to the receptacle and to the cover plate of an outlet box.

6. An adjustable connecting member for outlet boxes comprising a metallic disk having a plurality of separated screw holes near its periphery adapted to receive screws respectively pivotally connecting said member to the receptacle and to the cover plate of an outlet box.

In testimony whereof, I have signed my name to this specification.

JAMES G. BENNETT.